H. ROEDER.
COLLAR ATTACHMENT.
APPLICATION FILED APR. 12, 1911.
1,073,710.
Patented Sept. 23, 1913.
2 SHEETS—SHEET 1.
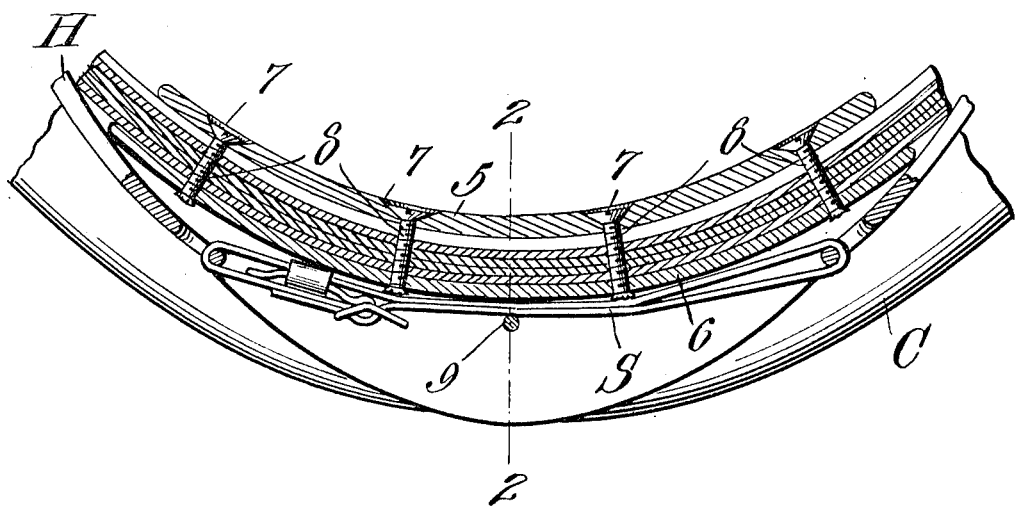
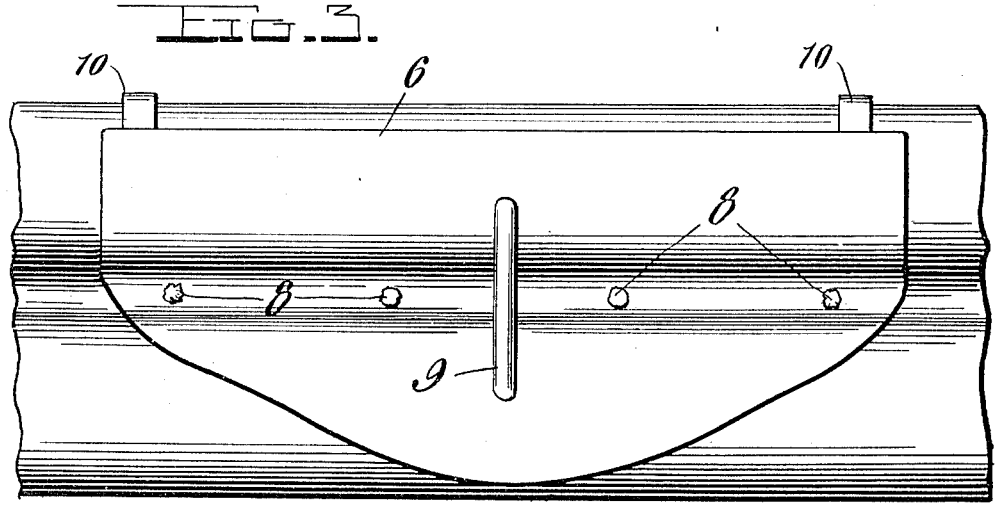
Witnesses
Chas. L. Griesbauer.
M. F. Rieser.
Inventor
H. Roeder,
By Watson E. Coleman,
Attorney

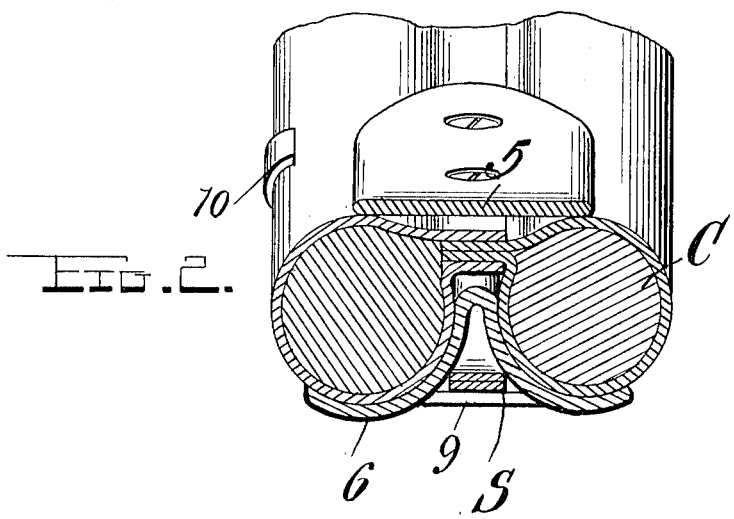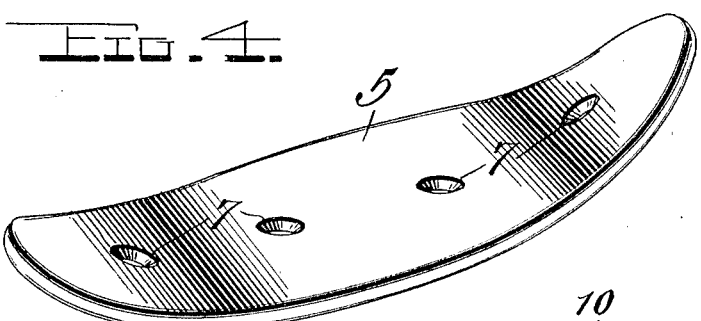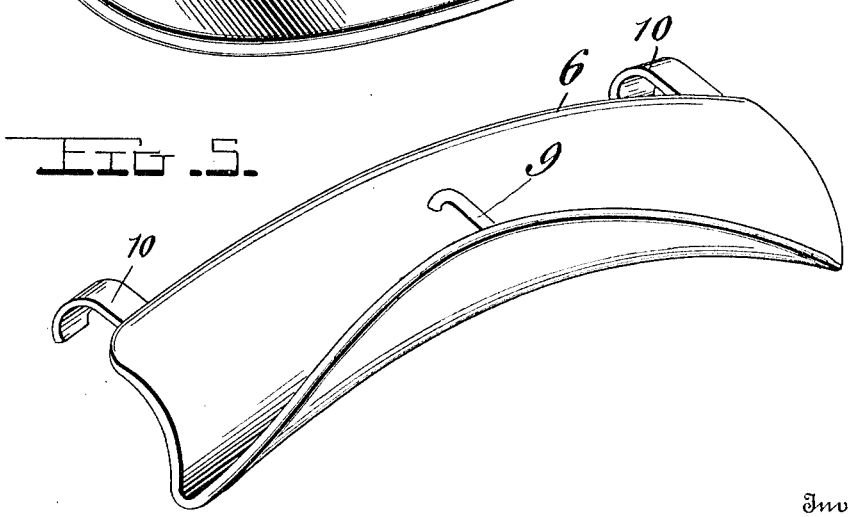

UNITED STATES PATENT OFFICE.

HENRY ROEDER, OF LONGMONT, COLORADO.

COLLAR ATTACHMENT.

1,073,710.　　　　　Specification of Letters Patent.　　Patented Sept. 23, 1913.

Application filed April 12, 1911.　Serial No. 620,582.

*To all whom it may concern:*

Be it known that I, HENRY ROEDER, a citizen of the United States, residing at Longmont, in the county of Boulder and State of Colorado, have invented certain new and useful Improvements in Collar Attachments, of which the following is a specification, reference being had to the accompanying drawings.

This invention relates to an attachment for horse collars and has for its primary object to provide a very simple and efficient device to prevent the collar from breaking in the throat as is a common occurrence with horse collars after a short period of use.

A further object of the invention resides in the provision of a pair of metal stiffening plates adapted to be placed upon opposite sides of the collar at the throat thereof, fastening screws extending through said plates to rigidly secure the same to the collar.

A still further object is to provide a device of the above character which is extremely inexpensive, strong and durable in practical use and may be easily and quickly attached to the ordinary form of horse collar.

With these and other objects in view, the invention consists of the novel features of construction, combination and arrangement of parts hereinafter fully described and claimed, and illustrated in the accompanying drawings, in which—

Figure 1 is a longitudinal section of the horse collar through the throat portion thereof illustrating the application of my attachment thereto; Fig. 2 is a section taken on the line 2—2 of Fig. 1; Fig. 3 is a side elevation of a portion of the collar; and Figs. 4 and 5 are detail perspective views of the parts of the attachment.

Referring in detail to the accompanying drawings C indicates a horse collar which may be made of any preferred material and of various forms. The hames H are adapted to be arranged upon the collar and to extend around the same in the usual manner. The lower ends of the hames are connected by means of the hame strap S across the throat of the collar while the upper end of the collar C is detachably connected to retain the same upon the neck of the animal.

The constant removal and positioning of the collar about the neck of the animal causes the collar to break in the throat owing to the fact that when the upper ends of the collar are disconnected the weight of the collar causes the collar to sag upon one side, the whole of the strain coming upon the central or throat portion thereof. This is a fault with both light and heavy collars, and has never been effectually overcome. It is with a view to eliminating the above mentioned deficiency in the construction of horse collars that my improved attachment is devised, and the same comprises two steel plates which are perfectly rigid. These plates are designated 5 and 6 respectively, the plate 5 being disposed upon the inner face of the collar or next to the hide of the animal. It is curved throughout its length as shown and lies closely upon the collar. This plate is also provided with a plurality of countersunk holes 7 to receive the fastening screws 8 which extend therethrough, and through the intermediate portion of the collar and are threaded in the other member 6 of the attachment. After the screws 8 are threaded through the plate 6 their protruding ends are clenched upon said plate to effectually prevent the screws working loose. The plate 6 is also bent or curved to conform to the longitudinal cross sectional configuration of the collar so that it will lie closely thereon. The central portion of the plate 6 is provided with a loop 9 through which the hame strap S is disposed, said plate being formed upon one edge and adjacent to each of its ends with a strap iron 10 which is adapted to be bent around the front edge of the collar as shown in Fig. 2. These straps are sufficiently malleable to be bent by means of a hammer into close engagement upon the collar. By the provision of these strap hooks, frictional engagement between the plate 5 and the heads of the fastening screws 8 which would be liable to sever the heads of the screws, is overcome. In this manner the durability of the device and its efficiency in practical use is materially increased.

From reference to Fig. 3 it will be noted that one of the longitudinal edges of the plate 6 is irregularly curved, so that said plate is reduced in width. This reduced portion of the plate extends forwardly under the front portion of the collar at the throat thereof and permits of the slight flexing of the collar adjacent to its central portion which is occasioned by the moving of the animal's head. By thus gradually reducing the forwardly extending part of the plate 6 in width from its central portion to its ends, liability of the edge of said plate cutting into the collar and marring the same is obviated. It will further be observed upon reference to Fig. 2 of the drawings that the longitudinal edges of the plate 5 are disposed inwardly of the front and rear edges of the collar and substantially in line with the longitudinal axes of the spaced cylindrical body portions thereof. By thus spacing the edges of the plate 5 from the front and rear edges of the collar, the animal's neck will not be chafed in the movement of the collar thereon. It will also be seen that as the loop rod 9 is disposed inwardly of the outermost surface portion of the oppositely curved parts of the plate 6, this loop rod is not liable to be broken off or distorted when the collar is removed from the neck of the animal.

It will be obvious that when the plates 5 and 6 are arranged upon the collar as shown in the drawing, that all liability of the hames slipping from the collar is also avoided. This often occurs with collars of the present construction, as when the collar is fastened and the hames tightened thereon, the throat portion of the collar is contracted or drawn out of shape, and the hames gradually work off of the collar owing to the difference in curvature of the face of the collar and the hames which engage thereon. By means of my attachment the throat portion of the collar is held perfectly rigid both when the hames are secured upon the same and when the ends are disconnected and spread apart to remove the collar from the animal's neck. Thus the life of the collar is materially lengthened and considerable expense eliminated.

The plates may be easily and quickly attached to the ordinary construction of collar, and it will be understood that the plates may be of such size and proportion as to properly fit the standard sizes of horse collars. They may also be formed of any desired material. It will further be obvious that if desired instead of clenching the ends of the screws 8, nuts may be threaded thereon but in order to overcome all possibility of the screws working loose I preferably use the former method of securing the screws in position.

While I have shown and described the preferred construction and arrangement of the various parts, it will be understood that the device is susceptible of considerable modification without departing from the essential feature or sacrificing any of the advantages of the invention.

Having thus described the invention what is claimed is:—

An attachment for horse collars comprising a longitudinally curved plate to be engaged with the under side of the throat portion of the collar and having oppositely extending concavo-convex portions forming an intermediate longitudinal groove, a loop bar secured at its ends to the oppositely extending portions of said plate and arranged transversely of the plate and bridging said intermediate groove, a transversely flat rigid metal plate to be engaged upon the upper side of the throat of the collar and resting only at its longitudinal edges upon the spaced body portions of said collar, a plurality of fastening screws extending through said plate and through the collar and through the first named plate to rigidly secure said plates upon the opposite faces of the collar, and strap irons formed upon one edge of the curved plate adjacent each end thereof and adapted to be bent around the front edge of the collar to reduce the frictional engagement between the second plate and the heads of the fastening screws.

In testimony whereof I hereunto affix my signature in the presence of two witnesses.

HENRY ROEDER.

Witnesses:
E. M. COLE,
ALBERT SCHAUER.

Copies of this patent may be obtained for five cents each, by addressing the "Commissioner of Patents, Washington, D. C."